United States Patent Office 3,375,298
Patented Mar. 26, 1968

3,375,298
CROSSLINKED POLYPHENYLENE OXIDE
Daniel W. Fox, Pittsfield, Mass., assignor to General
Electric Company, a corporation of New York
No Drawing. Filed May 21, 1965, Ser. No. 457,797
23 Claims. (Cl. 260—830)

ABSTRACT OF THE DISCLOSURE

A crosslinked polyphenylene oxide formed by the reaction of an amino-substituted polyphenylene oxide and a di- or poly-functional curing agent reactive therewith. The ability to crosslink makes the normally thermoplastic polyphenylene oxides thermosetting and resistant to many organic solvents. Epoxy resins can be reacted with the amino-substituted polyphenylene oxides to form copolymers.

---

This invention relates to highly cross-linked three-dimensional polyphenylene oxides which are the reaction products of amino-substituted polyphenylene oxides and di- or polyfunctional substituents reactive therewith. This invention also relates to highly cross-linked three-dimensional polymeric systems comprising the reaction products of mixtures of amino-substituted polyphenylene oxides and epoxy resins.

The polyphenylene oxides are thermoplastics composed essentially of unbranched, linear chains and are soluble in many organic solvents. It has now been found that they can be made thermosetting and solvent resistant by substituting amino groups in the polymer chain and reacting the amino-substituted polyphenylene oxides with a variety of reactants to yield crosslinked, three-dimensional resins.

In another embodiment of this invention, the amino-substituted polyphenylene oxides can be reacted with epoxy resins to produce a new class of copolymers.

The polyphenylene oxides have been described in U.S. Patent No. 3,306,875 of Allan S. Hay, incorporated herein by reference. In a preferred embodiment they may be represented by the following general formula:

I

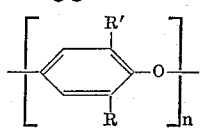

wherein the oxygen atom of one repeating unit is attached to the phenylene nucleus of an adjoining unit, R and R' are monovalent substituents selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of tertiary α-carbon atoms, and halohydrocarbonoxy radicals having at least two carbon atoms between the halogen atom and phenol nucleus and being free of a tertiary α-carbon atom and; $n$ represents a whole integer equal to 100 or more.

Typical examples of the monovalent hydrocarbon radicals that R and R' may be in the above formula are: alkyl, including cycloalkyl, e.g., methyl, ethyl, propyl, butyl, secondary butyl, cyclobutyl, amyl, cyclopentyl, hexyl, cyclohexyl, methylcyclohexyl, ethylcyclohexl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3-bromoallyl, 2- and 3-fluoropropargyl, mono- di-, tri-, tetra-, and pentachlorophenyl, mono-, di-, tri-, and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, naphthoxy, methylnaphthoxy, benzoxy, phenylethoxy, phenylpropoxy, tolylethoxy, etc. The monovalent halohydrocarbonoxy radicals may be the same as the above hydrocarbonoxy radicals, except methoxy and α-haloalkoxy radicals, where one or more of the hydrogens are replaced by a halogen, i.e., fluorine, chlorine, bromine, or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy, 2-, 3-, 4-, and 5-fluoroamoxy, 2-chlorovinoxy, 2- and 3-bromoalloxy, 2- and 3-fluoropropargoxy, mono-, di-, tri-, and tetrabromotoloxy, chloroethylphenoxy, ethylchloro phenoxy, iodoxyloxy, chloronaphthoxy, bromobenzoxy, chlorophenylethoxy, phenylchloroethoxy, bromotolylethoxy, etc.

Typical examples of polyphenylene oxides which may be employed in the process of this invention are: poly-(2,6-dimethyl-1,4-phenylene)-oxide, poly-(2,6-diethyl-1,4-phenylene) - oxide, poly - (2,6 - dibutyl-1,4-phenylene)-oxide, poly-(2,6-dilauryl-1,4-phenylene)-oxide, poly-(2,6-dipropyl-1,4-phenylene)-oxide, poly - (2,6-dimethoxy-1,4-phenylene) - oxide, poly - (2,6-diethoxy - 1,4-phenylene)-oxide, poly - (2-methoxy-6-ethoxy-1,4-phenylene) - oxide, poly-[2,6-di-(chlorophenoxy)-1,4-phenylene]-oxide, poly-[2,6-di-(chloroethyl) - 1,4 - phenylene] - oxide, poly-(2-methyl-6-isobutyl-1,4-phenylene)-oxide, poly-(2,6-ditolyl-1,4-phenylene) - oxide, poly - [2,6-di-(chloropropyl)-1,4-pheneylene] - oxide, poly - (2,6-diphenyl-1,4-phenylene)-oxide, etc.

The term "polyphenylene oxide" as used throughout this disclosure is intended to mean both the substituted and unsubstituted polyphenylene oxides.

The expression "three-dimensional" polyphenylene oxides means a cross-linked polyphenylene oxide wherein cross-linking bridges extend between linear polymer chains.

Briefly stated, the objects of this invention are accomplished by substituting amino groups on the polymer chain and reacting the amino-substituted polyphenylene oxides with a di- or polyfunctional reactant capable of reacting with the amino groups and non-reactive with the polyphenylene oxide nucleus. Such di- or polyfunctional compounds include, but are not limited to, di- or polyisocyanates, di- or polyacid anhydrides, di- or polyacid halides, di- or polyglycidyl ethers, di- or polyalkyl esters of polyfunctional acids, epoxy resins, etc.

The amino-substituted polyphenylene oxides from which the highly cross-linked three-dimensional polyphenylene oxides are formed may be prepared in a number of ways and the process for their preparation does not constitute a part of this invention. The amino substitution can take place either directly on the aryl nucleus or on a side chain attached to the aryl nucleus.

A method for preparing amino-substituted polyphenylene oxide wherein amino substitution takes place on the aryl nucleus is disclosed in copending U.S. Patent Application Ser. No. 155,826 of Willem F. H. Borman, filed Nov. 29, 1961, now Patent No. 3,226,361 and assigned to the same assignee as the present invention. According to the process of said application, amino substitution is effected through a series of steps beginning with nitration. Nitration can readily be achieved by reaction of the polyphenylene oxide with nitric acid. Variation of the concentration of the nitric acid or the duration of the reaction time makes it possible to introduce any number of nitro groups per repeating unit up to a maximum of 1. Nitro substituted polyphenylene oxides can also be prepared by copolymerization of 3-nitro phenols with the phenols mentioned in the Hay patent noted above. A composition in which all of the repeating units contain nitro substituents may be prepared by the homopolymerization of 3-nitro phenols. Polymers prepared either by treatment with nitric acid or by starting with nitro phenols are structurally similar as shown by their infrared spectra and behave chemically in an identical manner.

By reduction of the nitrated polymer, amino groups are formed on the aromatic nucleus. One of the hydrogen atoms of the amino group may be replaced by one alkyl group and the resulting polymer will still be capable of reacting with a cross-linking agent to form the highly cross-linked three-dimensional polymer.

To substitute an amino group on a side chain attached to the aromatic nucleus, one can pre-chlorinate or pre-brominate the side chain using any chlorinating or brominating process known to those skilled in the art. This side chain can subsequently be reacted with ammonia at elevated pressures and temperatures to produce side chain amino groups. An alternate process comprises reacting a halogenated side chain with potassium cyanide to form a nitrile. The nitrile can subsequently be catalytically reduced to convert the nitrile to the amine.

The cross-linked polyphenylene oxides are formed by the reaction of the amino-substituted polyphenylene oxides with di- or polyfunctional materials capable of reacting therewith. The character of the cross-linked polymer and the number of cross-linking bridges per polymeric chain is dependent upon the nature of the cross-linked polymer desired. If a highly cross-linked polymer is desired, one cross-linking bridge per repeating unit may be generated. On the other hand, when only slight cross-linking is desired, one cross-linking bridge per 100 repeating units is sufficient. To reduce the number of cross-linking bridges below one per 100 repeating units would serve no practical purpose as the resulting polymer would be essentially thermoplastic as is linear polyphenylene oxide. Accordingly, one cross-linking bridge per repeating unit to one cross-linking bridge per 100 repeating units constitutes a preferred embodiment of this invention. Those polymers wherein the number of cross-linking bridges varies from one per repeating unit to one per 25 repeating units have the most desirable properties and this constitutes the most preferred embodiment of this invention.

It is, of course, understood that the number of cross-linking bridges referred to above represents an average value and that the distribution of cross-linking bridges between polymeric chains is in actuality a random distribution.

The number of cross-linking bridges between polymeric chains is controlled by the number of amino substituents on a polymeric chain and the concentration of cross-linking agent employed. The number of amino groups on a polymeric chain is regulated by the reaction conditions used to form the amino-substituted polyphenylene oxide as discussed supra.

In general, any organic compound having two or more functional groups capable of reacting with amino groups may be used as a cross-linking agent. Typical examples of suitable cross-linking agents are the di- or polyisocyanates, di- or polyacid anhydrides, di- or polyacid chlorides, di- or lower polyalkylesters, di- or polyhalo substituted alkyls and epoxy materials. If an epoxy resin is used, the resulting polymer may be a copolymer of an epoxy resin and a polyphenylene oxide or a polyphenylene oxide cross-linked with low molecular weight epoxy resin bridges or an epoxy resin cross-linked with low molecular weight polyphenylene oxide bridges. The particular form of the resulting polymer is dependent upon the quantity or proportion of the polyphenylene oxide and the epoxy resin used. The form of the resulting polymer is also dependent upon the molecular weight or number of repeating units per polymer chain of each of the resins employed.

The particular di- or polyfunctional material reacted with the amino-substituted polyphenylene oxide to form the cross-linked, three-dimensional polyphenylene oxides of this invention is not critical provided it does not react with the phenylene nucleus. Typical examples of the isocyanates that may be employed include, but are not limited to, ethylene diisocyanate, butylene diisocyanate, cyclohexylene diisocyanate, phenylene diisocyanate, chloroethylene diisocyanate, tolylene diisocyanate, naphthalene diisocyanate, ditolylene diisocyanate, dianisidine diisocyanate, 1,6-hexamethylene diisocyanate, etc.

Typical examples of the diacid anhydrides that may be used include phthalic anhydride, tetrachlorophthalic anhydride, diphenic acid anhydride, trimellitic anhydride, pyromellitic dianhydride, benzophenone dianhydride, succinic anhydride, maleic anhydride, etc.

Typical examples of the diacid halides include iso- and terephthaloyl chloride, diphenoyl chloride, adipoyl chloride, sebacoyl chloride, iso- and terephthaloyl bromide, adipoyl bromide, sebacoyl bromide, diphenyl bromide, etc.

Typical examples of the di- or polyalkylesters include acid-rich glycol, glycerol or bisphenol phthalates, adipates, sebacates, maleates, trimellitates, etc.

Typical examples of diglycidyl ethers and epoxy resins suitable for reaction with the amino-substituted polyphenylene oxides are those derived from polyhydric phenols such as resorcinol, hydroquinone, pyrocatechol, saligenin, phloroglucinol, etc.; polynuclear polyhydroxy phenols such as 2,2'bis-(4-hydroxyphenyl)propane, 2,2' bis-(4 - hydroxyphenyl)methane, 2,2'bis - (2,4,4' - trihydroxyphenyl)propane, 4,4'dihydroxybiphenyl, 2,2'bis-(4,4'-hydroxyphenyl)sulfone, etc.; polyalcohols such as ethylene glycol, 2,3-butanediol, erythritol, glycerol, etc.; the epoxylated novolacs, etc.

The quantity of epoxy resin used with the polyphenylene oxide can vary between 1 and 99 percent, by weight, depending on the final polymer desired and the amine and epoxy equivalents of the reactants. Also the molecular weight of the epoxy resin can vary between very wide limits. For example, when the epoxy resin is used as a curing agent for the polyphenylene oxides, short chain lengths are employed. On the other hand, when an epoxy resin cross-linked with a polyphenylene oxide is desired, the epoxy resin will probably have polymer chains with 50 repeating units or more. When a copolymer having equal quantities of polyphenylene oxide and epoxy resin is desired, the amine equivalent of the polyphenylene oxide should approximate the epoxide equivalent of the epoxy resin.

The manner of adding the curing agent to the amino-substituted polyphenylene oxide is not critical and any blending methods known to those skilled in the art may be employed. Thus, the curing agent and the polymer, both in finely divided or powdered form, may be tumbled together until the mixture is homogeneous and then the mixture extruded into pellets. Another method in the case of finely divided polymeric material is to grind both the polymer and curing agent together until a homogeneous mixture is obtained, after which they are molded or extruded. A third method comprises dissolving both the curing agent and polymer in a common non-reactive solvent followed by evaporation of the solvent.

With many of the curing agents employed in combination with the substituted amino groups, the combination is so reactive as to permit cure without employing high curing temperatures. However, to obtain a high degree of cure, it may be necessary to heat to a temperature ranging between 100° F. and 250° F. The curing time is not critical and will vary depending on the particular curing agent employed.

The quantity of curing agent is not critical. One equivalent of curing agent for each functional amino group on the polymeric chain is normally sufficient. Generally speaking, the quantity of curing agent may range from 0.1 to 25 percent, by weight, of the polymer. When an epoxy resin is used in combination with an amino-substituted polyphenylene oxide, the quantity of polyphenylene oxide or epoxy resin may vary between 1 and 99 percent, by weight, of the total composition. The total quantity is dependent upon the properties of the copolymer desired. A preferred range constitutes between 40 and 60 percent, by weight, polyphenylene oxide and 60 to 40 percent epoxy resin.

The following examples illustrate the manner of forming amino-substituted polyphenylene oxides as well as the formation of the highly cross-linked three-dimensional polyphenylene oxide systems of this invention. The examples are merely for the purposes of illustration and should not be construed as limiting.

The first two examples illustrate a process for the nitration of the aromatic ring of a polyphenylene oxide polymer.

EXAMPLE 1

In this example, 1,500 ml. of 70% nitric acid were stirred and cooled to 0° C. Thereafter, 100 g. of poly-(2,6-dimethyl-1,4-phenylene)-oxide having an intrinsic viscosity of .13 dl/g. as measured in chloroform at 30° C. were dissolved in 500 ml. of chloroform and gradually added to the nitric acid. The mixture was stirred for four hours while maintained at 0° C. in an ice bath. At the end of four hours, the ice bath was removed and stirring continued for an additional hour while the temperature was allowed to rise to 25° C. A precipitate was formed by adding methanol. This was filtered and washed with methanol and dried in a desiccator over sulfuric acid. The yield was 99 g. of nitro substituted polyphenylene oxide having a nitrogen content of 6.6% by weight or approximately .7 nitro groups per aromatic nucleus.

EXAMPLE 2

In this example, 100 g. of poly-(2,6-dimethyl-1,4-phenylene)-oxide were dissolved in 500 ml. of chloroform at room temperature. After dissolution of the polymer, 24 ml. of 70 percent nitric acid were added dropwise to the solution. The solution was stirred during the addition of the nitric acid. Stirring was continued for 5½ hours. Thereafter, the nitrated polyphenylene oxide was precipitated by adding an excess of methanol. The precipitate was filtered, washed with methanol, and dried as in Example 1. The nitrogen content was found to be 1.26 percent, by weight, or approximately 1 nitro group per 11 aromatic nuclei.

EXAMPLE 3

This example illustrates how a polymer may be prepared from a nitrated monomer.

In this example, 3-nitro-2,6-dimethyl phenol monomer was prepared by nitrating 2,6-dimethyl-aniline with 70 percent nitric acid to yield 3-nitro-2,6-dimethyl-aniline which was subsequently converted to the phenol through diazotization and hydrolysis. Thereafter, 12.6 g. of the nitrodimethyl phenol were polymerized by dissolving the nitrated monomer in a mixed solvent consisting of 150 ml. each of nitrobenzene and isopropyl alcohol and a catalyst consisting of 0.6 g. of cuprous chloride and 2.5 g. of tetramethylbutanediamine. The mixture was stirred with a vibrating type apparatus while oxygen was passed through for a period of five hours. The polymer was recovered by adding the reaction mixture to 1,000 ml. of methanol containing 2% hydrochloric acid. The precipitated polymer was filtered, washed with methanol, and dried overnight at 80° C. The resultant poly-(3-nitro-2,6-dimethylphenylene)-oxide had an intrinsic viscosity of .17 dl./g. as measured in chloroform at 25° C.

EXAMPLE 4

This example illustrates a process for the reduction of a nitro-substituted polyphenylene oxide.

In this example, 35 g. of the nitrated poly-(2,6-dimethyl-1,4-phenylene)-oxide polymer containing .73 nitro groups per repeating phenylene unit of Example 1 were utilized. The nitrated polyphenylene oxide was mixed with 350 g. of $SnCl_2 \cdot 2H_2O$ and 500 ml. of 33% hydrochloric acid. The mixture was refluxed with continuous stirring for 4½ hours. After cooling, the reaction product was poured over an excess of chopped ice in a Pyrex beaker and 600 g. of sodium hydroxide in 40% aqueous solution was added. At first, a precipitate of tin hydroxide formed, which dissolved in the excess hydroxide. The resulting slurry could not be centrifuged due to the high density of the sodium chloride solution, and was thereafter filtered through a glass filter. The residue was washed with water and methanol and redissolved in methanol with the addition of 6 ml. of 33% hydrochloric acid. The solution was subsequently filtered, and the filtrate made alkaline with 10% sodium hydroxide. Additional water was added to dissolve the precipitate of sodium chloride. The product was filtered, washed twice with water and three times with methanol, and dried in air for a period slightly in excess of 48 hours. The yield was 20 g. of polymer containing 5.63% nitrogen. There were no traces of chlorine in the polymer.

EXAMPLE 5

This example illustrates another procedure for reducing a nitrated low molecular weight polyphenylene oxide. In this example, 10 g. of nitrated poly-(2,6-dimethyl-1,4-phenylene)-oxide were suspended in 400 ml. of concentrated hydrochloric acid. Thirty g. of tin powder were added and the resulting suspension refluxed in a reflux condenser for six hours. The temperature was lowered and the mixture was allowed to stand for approximately 12 hours with continuous stirring. At the termination of 12 hours, the suspension was filtered and the residue washed with 40% sodium hydroxide and water. The resin was dissolved in tetrahydrofuran, the solution filtered, and the polymer reprecipitated by the addition of methanol, a non-solvent. The precipitate was thereafter dried in vacuum over sulfuric acid. The yield was 5 g.

EXAMPLE 6

This example illustrates the procedure for introducing amino groups on alkyl side chains attached to the aromatic nucleus of a polyphenylene oxide. Twenty g. of brominated poly-(2,6-dimethyl-1,4-phenylene)-oxide containing two bromine substituents per phenylene unit of which ¾ were on the side chain methyl groups and ¼ on the aromatic nucleus were dissolved in 600 ml. of tetrahydrofuran. The solution was heated to boiling and 40 g. of potassium cyanide in 50 ml. of water were added along with 1 g. of iodine. The mixture was stirred and refluxed for 8 hours. Thereafter, the solution was filtered to remove potassium bromide formed during the reaction and the polymer precipitated with methanol that had been acidified with hydrochloric acid. The resultant precipitate was washed several times with acetone and methanol in a Waring Blendor. The cyano-substituted polyphenylene oxide was then dried.

Thereafter, 11 g. of this material were dissolved in 500 ml. of tetrahydrofuran. Three g. of Raney nickel were added and the material was hydrogenated in a Parr reactor. The solution was filtered to remove the catalyst and the polymer precipitated from the filtrate by the addition of acidified methanol. The aminated product was washed with methanol and dried over sulfuric acid in a desiccator. The dried product yield was 4 g.

The following examples illustrate how the products of my invention may be used with curing agents and as co-reactants with other polymer systems.

EXAMPLE 7

This example illustrates how amino-substituted poly-(2,6-dimethyl-1,4-phenylene)-oxide may be used with an epoxy resin.

In this example, 5½ g. of amino-substituted poly-(2,6-dimethyl-1,4-phenylene)-oxide with an intrinsic viscosity of .5 dl./g. were dissolved in 10 g. of a diglycidyl ether of 2,2'-bis-(4-hydroxyphenyl)-propane on a steam bath and poured into several aluminum weighing dishes. The mixture thickened appreciably in 5–10 minutes and the samples were placed in a 150° C. oven overnight. The products resulting from this reaction were hard, relatively flexible, and retained their toughness at a temperature of 150° C. They were insoluble in boiling pyridine.

Two control samples were made using the same procedure as above, but substituting 5½ g. of poly-(2,6-dimethyl-1,4-phenylene)-oxide free of amino substitution in the one case and 1½ g. diethylene triamine in the other. The product containing non-aminated polyphenylene oxide polymer remained soft and dissolved completely in pyridine. The sample containing the diethylene triamine cured rapidly but had no integrity at 150° C. This indicates that the aminated polyphenylene oxide was an effective curing agent for the epoxy resin since without it, the epoxy resin did not cure. Further, the cured product was hard and tough at 150° C. It also indicates how the physical properties of the cross-linked epoxy resin are superior when the curing agent is an aminated polyphenylene oxide rather than a more conventional amine curing agent.

The following two examples illustrate how the aminated polyphenylene oxides of my invention may be used with other curing agents to form highly cross-linked polyphenylene oxides.

EXAMPLE 8

In this example, 1.7 g. of the same amino-substituted polyphenylene oxide of Example 7 were mixed with 1 g. of pyromellitic di-anhydride using a mortar and pestle to blend the materials. The mixture was transferred to a small mold and heated in a platen press to 295° C. After pressing, the mold was left to cool overnight. The product was a hard, dark brown plate which did not dissolve in hot pyridine. A control sample was formulated using the same procedure and the same amino substituted polyphenylene oxide as in Example 7, but free of the pyromellitic di-anhydride. Again, a hard, dark brown plate was formed, but this time the product dissolved in hot pyridine.

EXAMPLE 9

Using the aminated polyphenylene oxide of Example 7, a solution was made by dissolving the aminated polyphenylene oxide of Example 7 in pyridine. A few drops of toluene di-isocyanate were added. This caused the immediate gelation of the solution. The solvent was removed by heating the gel overnight on a steam bath. The residue was found to be completely insoluble in boiling pyridine. Polyphenylene oxide free of amino groups does not react with toluene di-isocyanate under the same conditions.

EXAMPLE 10

In this example, various nitro-substituted polyphenylene oxide samples were blended to yield a polymer mixture which contained approximately 6 to 8 weight percent nitro groups. This corresponds to an average of approximately 1 nitro group per 3 or 4 aromatic rings. This material was reduced by adding 50 g. of the nitrated polyphenylene oxide to a 1,000 ml. flask equipped with a reflux condenser and a stirrer. Thereafter, 350 ml. of dioxane, 50 ml. of acetic acid and 10 ml. of water were added and the mixture brought to reflux. To this mixture, 25 g. of zinc dust were added through the condenser over a period of 1½ hours. The mixture was then allowed to reflux for an additional 6 hours. The mixture was cooled and allowed to stand overnight. On the following day, to insure complete reduction, an additional 25 ml. of acetic acid and 20 g. of zinc dust were added and the mixture refluxed for an additional 4 hours. After cooling, the mixture was filtered to remove solids and the polymer precipitated by the addition of a 50—50 mixture of methanol and water. The product was repeatedly washed with alcohol and water and finally dried at 100° C. overnight. The yield was 30 g. An analysis of the product indicated that it contained approximately 3.70 percent active amine content. This indicates that the polymer had an amino equivalent weight of about 420 and contained approximately 1 amino group per 3 to 4 repeating units.

A series of tests were then run to determine the ability of this amino-substituted polyphenylene oxide to crosslink with various curing agents.

EXAMPLE 11

In this example, the amino-substituted polyphenylene oxide of Example 10 (amino equivalent 420) was mixed with an epoxy resin having an epoxide equivalent of 171 (Epon 826 available from Shell Chemical Company) in a weight ratio of approximately 2½ parts polyphenylene oxide to 1 part epoxy resin. The combining ratio is calculated to yield a 1:1 equivalent ratio of amino groups to epoxy groups. The mixture of resins was dissolved in tetrahydrofuran in an aluminum weighing dish. This was heated to 80° C. to remove most of the tetrahydrofuran. The mixture was maintained at this temperature for approximately 10 minutes and thereafter, heated to 105° C. and maintained at that temperature for an additional 10 minutes. Thereafter, the mixture was heated to 150° C. and samples were periodically taken from the dish and dissolved in tetrahydrofuran to determine the degree of curing. A sample did not dissolve in boiling tetrahydrofuran after cure of approximately 40 minutes at 150° C. This failure to dissolve indicated that the polymer had achieved a high degree of cross-linking due to the presence of the epoxy resin.

EXAMPLE 12

In this example, the amino-substituted polyphenylene oxide of Example 10 was mixed with pyromellitic dianhydride in a weight ratio of approximately 8 parts amino-substituted polyphenylene oxide to 1 part pyromellitic di-anhydride which corresponds to a 1:1 equivalent ratio of functional groups. Both ingredients were dissolved in tetrahydrofuran and put on a tray to permit evaporation of most of the tetrahydrofuran. Curing was accomplished in much the same way as in the previous example, i.e., the materials were heated at 150° C. with samples periodicaly being removed to test the extent of curing. This was done by dropping a sample of the polymer in boiling tetrahydrofuran to determine if it would dissolve. It was found that after 40 minutes of heating at 150° C., the polyphenylene oxide would not dissolve in the solvent.

EXAMPLE 13

In this example, the amino-substituted polyphenylene oxide of Example 10 was mixed with bitolylene di-isocyanate in a weight ratio of approximately 3 parts polyphenylene oxide to 1 part di-isocyanate. The reactants were dissolved in dioxane and dried and finally cured for 40 minutes at 150° C. The cured plastic was found to be insoluble in dioxane, again indicating a high degree of cross-linking.

EXAMPLE 14

Dimethylterephthalate was added to the amino-substituted polyphenylene oxide of Example 10 in a ratio of 4½ parts of amino-substituted polyphenylene oxide to 1 part dimethylterephthalate. The mixture was dissolved in dioxane and cured at 150° C. for 4 hours. The so-cured material was found to be insoluble in dioxane.

EXAMPLE 15

In this example, the amino-substituted polyphenylene oxide of Example 10 was mixed with phthalic anhydride in a weight ratio of 6 parts polyphenylene oxide to 1 part phthalic anhydride. The mixture was dissolved in tetrahydrofuran and cast as a film. After evaporation of the tetrahydrofuran, the film was cured at 150° C. for 4 hours. The resultant cross-linked polymer was insoluble in tetrahydrofuran.

EXAMPLE 16

In this example, the amino-substituted polyphenylene oxide of Example 10 was mixed with trimellitic anhydride in a ratio of approximately 7 parts amino-substituted polyphenylene oxide to 1 part trimellitic anhydride. The mixture was dissolved in dioxane, heated to evaporate the dioxane and cured at 150° C. for 45 minutes. The resultant cross-linked polymer was found to be insoluble in dioxane.

EXAMPLE 17

In this example, a sample of the amino-substituted polyphenylene oxide of Example 10 was dissolved in tetrahydrofuran and heated to 150° C. for 4 hours. At the end of this period, polymer was soluble in the tetrahydrofuran. The reason for this is that no curing agent was added to the polymer. This indicates that the curing additives in the previous examples are necessary in order to obtain a polymer having a high degree of cross-linking.

Obviously, other modifications and variations of the present invention are possible in the light of the above teachings. It is, therefore, to be understood that changes may be made in the particular embodiments of the invention as defined by the appended claims.

What I claim as new and desire to secure by Letters Patent of the United States is:

1. A cross-linked, three dimensional polyphenylene oxide which is the reaction product of
   (a) a member selected from the group consisting of a polyphenylene oxide having amino substitution on the phenylene nucleus, a polyphenylene oxide having amino substitution on a side chain attached to the phenylene nucleus and mixture thereof, and
   (b) a polyfunctional organic compound capable of reacting with the amino group to form a crosslinking bridge and selected from the group consisting of di- and polyisocyanates, di- and polyacid anhydrides, di- and polyacid halides, di- and polyalkyl esters of polyfunctional acids and epoxy resins having more than one epoxy group per molecule.

2. The cross-linked, three-dimensional polyphenylene oxide of claim 1 wherein the polyphenylene oxide is poly-(2,6-dimethyl-1,4-phenylene)-oxide.

3. The cross-linked, three-dimensional polyphenylene oxide of claim 1 wherein the polyphenylene oxide is poly-(2,6-diphenyl-1,4-phenylene)-oxide.

4. The cross-linked, three-dimensional polyphenylene oxide of claim 1 wherein the number of cross-linking bridges between polymeric chains ranges from about 1 per repeating unit to about 1 per 100 repeating units.

5. The cross-linked, three-dimensional polyphenylene oxide of claim 1 wherein the polyfunctional organic compound is a di-acid anhydride.

6. The cross-linked, three-dimensional polyphenylene oxide of claim 1 wherein the polyfunctional organic compound is a di-loweralkylester.

7. The cross-linked, three-dimensional polyphenylene oxide of claim 1 wherein the polyfunctional organic compound is a diisocyanate.

8. The cross-linked, three-dimensional polyphenylene oxide of claim 1 wherein the polyfunctional organic compound is a di-acid chloride.

9. The cross-linked, three-dimensional polyphenylene oxide of claim 1 wherein the polyfunctional organic compound is an epoxy resin.

10. The cross-linked, three-dimensional polyphenylene oxide of claim 9 wherein the epoxy resin constitutes from 1 to 99 percent by weight of the total composition.

11. The cross-linked, three-dimensional polyphenylene oxide of claim 9 wherein the epoxy resin constitutes from 40 to 60 percent by weight of the total composition.

12. A cross-linked, three-dimensional poly-(2,6-dimethyl-1,4-phenylene)-oxide which is the reaction product of a poly-(2,6-dimethyl-1,4-phenylene)-oxide having amino substitution on a methyl group, the phenylene nucleus or both and a curing agent selected from the group consisting of di- and polyisocyanates, di- and polyacid anhydrides, di- and polyacid halides, di- and polyalkyl esters of polyfunctional acids and epoxy resins having more than one epoxy group per molecule.

13. The cross-linked, three-dimensional poly-(2,6-dimethyl-1,4-phenylene)-oxide of claim 12 wherein the number of cross-linking bridges between polymeric chains varies between 1 per repeating unit to 1 per 100 repeating units.

14. A copolymer consisting of a poly-(2,6-dimethyl-1,4-phenylene)-oxide and an epoxy resin having more than one epoxy group per molecule, the two polymers joined by crosslinking bridges of a radical formed by reaction of an amino group substituted on the poly-(2,6-dimethyl-1,4-phenylene)-oxide and an epoxy group from the epoxy resin.

15. The copolymer of claim 14 wherein the epoxy resin constituted from 1 to 99 percent, by weight, of the polymer composition.

16. The copolymer of claim 14 wherein the epoxy resin constitutes from 49 to 60 percent, by weight, of the polymer composition.

17. The crosslinked poly(2,6-dimethyl-1,4-phenylene) oxide of claim 13 where the curing agent is toluene diisocyanate.

18. The crosslinked poly-(2,6-dimethyl-1,4-phenylene) oxide of claim 13 where the curing agent is phthalic anhydride.

19. The crosslinked poly-(2,6-dimethyl-1,4-phenylene) oxide of claim 13 where the curing agent is pyromellitic dianhydride.

20. The crosslinked poly-(2,6-dimethyl-1,4-phenylene) oxide of claim 13 where the curing agent is isophthaloyl dichloride.

21. The crosslinked poly-(2,6-dimethyl-1,4-phenylene) oxide of claim 13 where the curing agent is dimethyl terephthalate.

22. The crosslinked poly-(2,6-dimethyl-1,4-phenylene) oxide of claim 13 where the curing agent is the diglycidyl ether of 2,2'-bis(4-hydroxyphenyl)-propane.

23. The crosslinked poly-(2,6-dimethyl-1,4-phenylene) oxide of claim 13 where the curing agent is a partially polymerized reaction product of 2,2'-bis(4-hydroxyphenyl)-propane and epichlorohydrin.

No references cited.

MURRAY TILLMAN, *Primary Examiner.*

PAUL LIEBERMAN, *Assistant Examiner.*